US009452836B2

(12) United States Patent
Mariat et al.

(10) Patent No.: US 9,452,836 B2
(45) Date of Patent: Sep. 27, 2016

(54) LIGHTING DEVICE FOR THE INTERIOR FURNISHING OF AN AIRCRAFT CABIN

(71) Applicant: Airbus Corporate Jet Centre, Blagnac (FR)

(72) Inventors: Sylvain Mariat, Leguevin (FR);
Jean-Cyrille Destieu, Merville (FR);
Beranger Chantal, Bretx (FR);
Jean-Luc Legros, Toulouse (FR);
Nicolas Ferrere, La Villedieu du Temple (FR); Pascal Taffarello, Bessieres (FR)

(73) Assignee: Airbus Corporate Jet Centre, Blagnac (FR)

( * ) Notice: Subject to any disclaimer, the term of this patent is extended or adjusted under 35 U.S.C. 154(b) by 0 days.

(21) Appl. No.: 14/700,690

(22) Filed: Apr. 30, 2015

(65) Prior Publication Data

US 2015/0314873 A1 Nov. 5, 2015

(30) Foreign Application Priority Data

Apr. 30, 2014 (FR) ...................................... 14 53979

(51) Int. Cl.
*B64D 11/00* (2006.01)
*B64C 1/18* (2006.01)

(52) U.S. Cl.
CPC ................. *B64D 11/00* (2013.01); *B64C 1/18* (2013.01); *B64D 2011/0038* (2013.01)

(58) Field of Classification Search
CPC .. B60D 11/00; B60D 2011/0038; B64C 1/18
USPC ........................................ 362/470, 471, 490
See application file for complete search history.

(56) References Cited

U.S. PATENT DOCUMENTS

| 5,647,658 | A  | * | 7/1997  | Ziadi ...................... | B60Q 3/005 362/471 |
| 8,656,677 | B2 | * | 2/2014  | Kernmayer ............. | B60R 13/02 244/120 |
| 2007/0109802 | A1 | * | 5/2007  | Bryan .................... | B60Q 3/025 362/471 |
| 2009/0103320 | A1 | * | 4/2009  | Clark ..................... | B60Q 3/025 362/470 |
| 2010/0201951 | A1 | * | 8/2010  | Budinger ............... | B60Q 3/025 353/13 |
| 2011/0255296 | A1 | * | 10/2011 | Hashberger ............ | B60Q 3/025 362/471 |
| 2015/0151850 | A1 | * | 6/2015  | Eakins ................... | B64D 47/02 362/471 |
| 2015/0232168 | A1 | * | 8/2015  | Kircher .................. | B64C 1/066 244/119 |

FOREIGN PATENT DOCUMENTS

DE         202010018073         12/2013

OTHER PUBLICATIONS

French Search Report, Jan. 22, 2015.

* cited by examiner

*Primary Examiner* — Laura Tso
(74) *Attorney, Agent, or Firm* — Greer, Burns & Crain Ltd.

(57) ABSTRACT

An aircraft fuselage comprising a structural wall and a floor delimiting a cabin for passengers, said wall being covered by a plurality of adjacent trim panels arranged in succession in the longitudinal direction of the fuselage and spaced from one another with a gap between two adjacent panels. Each panel is also fixed to the wall and has a concave shape adapted to the shape of the fuselage. At least one lighting device is disposed at the level of at least one of the gaps and is arranged perpendicularly to a longitudinal axis of the fuselage. The lighting device comprises a housing fixed to the wall. The housing is provided with an opening on a face oriented toward the interior of said cabin. The housing further comprises at least one lighting element making it possible to light the cabin through the gap.

11 Claims, 8 Drawing Sheets

LIGHTING DEVICE FOR THE INTERIOR FURNISHING OF AN AIRCRAFT CABIN

CROSS-REFERENCES TO RELATED APPLICATIONS

This application claims the benefit of the French patent application No. 1453979 filed on Apr. 30, 2014, the entire disclosures of which are incorporated herein by way of reference.

BACKGROUND OF THE INVENTION

The invention relates to the furnishing of an aircraft cabin. More particularly, the invention relates to a lighting device for hiding the gap at the junction of two trim panels of an aircraft cabin.

As is known, technical installations intended for the ventilation system, the oxygen network or the electrical network of the aircraft are arranged in the passenger cabin. These installations are attached to longitudinal rails fixed to the fuselage and arranged on the sides of the fuselage, both in the upper part (upper rails) of the fuselage and in the intermediate part at the level of the windows of the fuselage (lower rails).

In order to hide these installations from the view of the passengers, the cabin comprises an interior furnishing formed of a number of trim panels fixed removably to the fuselage and arranged in succession in the longitudinal direction of the cabin.

The trim panels are of two different types:
side trim panels extending along the two lateral sides of the fuselage from a lower rail to an upper rail; and
ceiling trim panels hiding the space between the two upper rails.

In order to light the cabin, it is known to drill holes on the trim panels so as to allow the fixation of lighting elements of the neon tube type. This solution is not optimum, since the trim panels can break during the drilling process. In addition, operators wishing to remove the furnishing of the cabin in full or in part must first carefully remove all or some of these lighting elements as well as the electrical power supplies thereof connected to the electrical installations of the aircraft, which lengthens the maintenance operations. Furthermore, this solution deprives the operators of the light provided by these lighting elements when the trim panels are removed.

SUMMARY OF THE INVENTION

An object of the present invention is to overcome these disadvantages wholly or in part.

To this end, the present invention relates to an aircraft fuselage comprising a structural wall and a floor delimiting a cabin for passengers, said wall being covered by a plurality of adjacent trim panels arranged in succession in the longitudinal direction of the fuselage and spaced from one another with a gap between two adjacent panels, each panel also being fixed to the wall and having a concave shape adapted to the shape of the fuselage, at least one lighting device being disposed at the level of at least one of the gaps, and being arranged perpendicularly to a longitudinal axis of the fuselage, said lighting device comprising a housing fixed to the wall, said housing being provided with an opening on a face oriented toward the interior of said cabin, said housing further comprising at least one lighting element making it possible to light the cabin through the gap.

Thus, said housing of the lighting device and the trim panels have no mechanical connection to one another besides a point contact. The disassembly of the trim panels, which no longer comprise lighting elements, is thus facilitated and, moreover, this disassembly no longer removes the lighting of the cabin.

BRIEF DESCRIPTION OF THE DRAWINGS

The features of the invention mentioned above, as well as other features will become clearer upon reading the following description of an exemplary embodiment, said description being provided with reference to the accompanying drawings, in which.

DETAILED DESCRIPTION OF THE PREFERRED EMBODIMENTS

Figure 1:
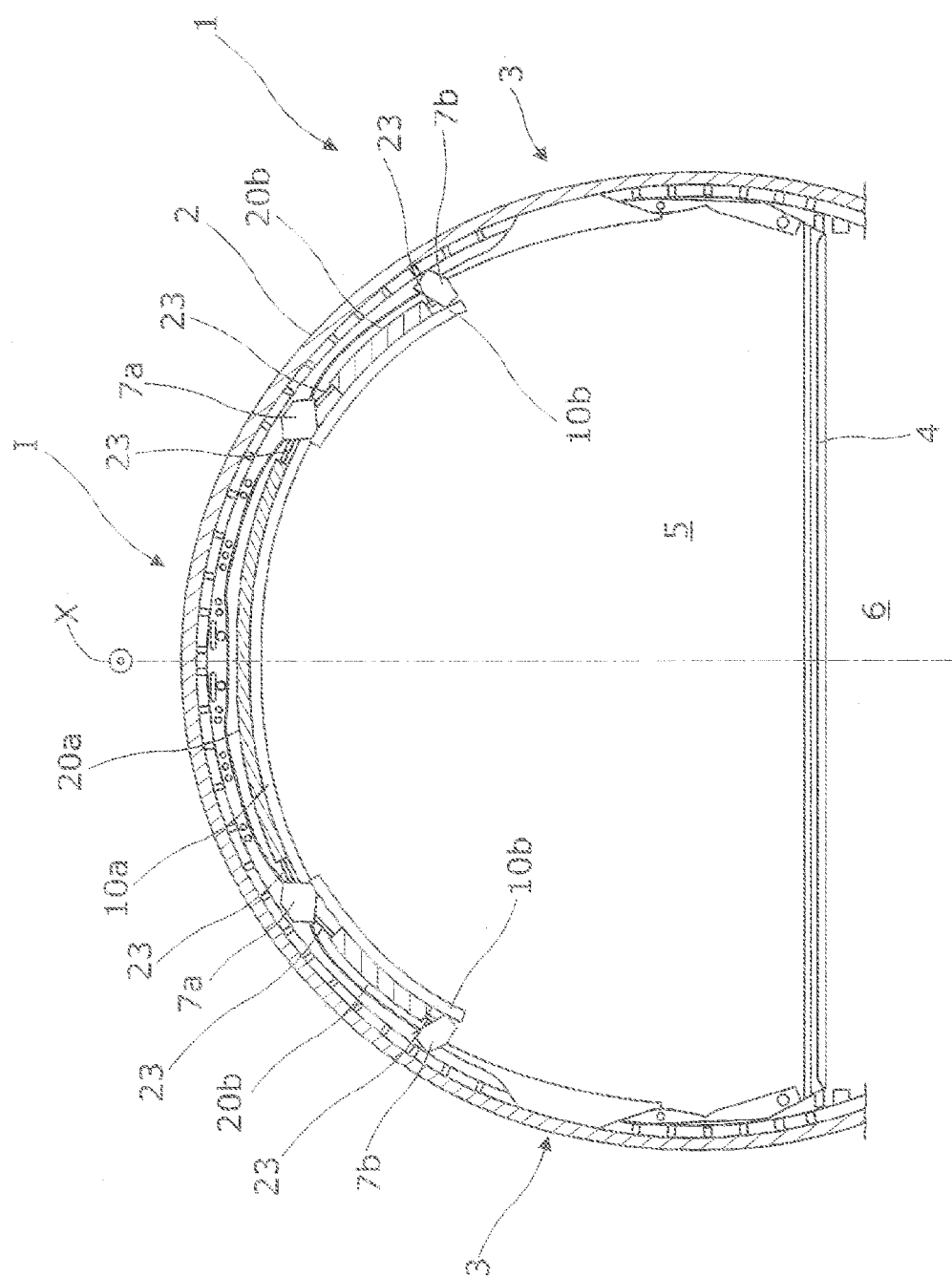
FIG. 1 is a partial cross section of a fuselage of an aircraft comprising a structural wall delimiting a passenger cabin and lighting devices according to an embodiment of the invention.

The fuselage of an aircraft 1, shown in part in FIG. 1, usually comprises a substantially cylindrical structural wall 2 incorporating side windows 3, and a floor 4 separating the interior of the fuselage into an upper compartment 5 for the passengers, denoted hereinafter as the "passenger cabin", and a lower compartment 6 for the cargo in particular.

As is known, the structural wall 2 comprises, on each side of the fuselage, at least two longitudinal rails 7a, 7b (which may comprise a plurality of sections), fixed to said wall by fixing elements, such as connecting rods and attachment angles (not shown in the figures). Each rail 7a, 7b supports different technical installations (not shown in the figures), as described further above, and an interior furnishing so as to hide the rails, the structural wall 2 and the technical installations.

The rails 7a, 7b run in parallel along the length of the fuselage in the longitudinal direction X and are disposed, on each side of the fuselage, both in the upper part of the cabin 5 for the rail 7a referred to as the upper rail, and in the intermediate part, more precisely above the windows 3, of the cabin 5 for the rail 7b referred to as the lower rail.

Figure 2:
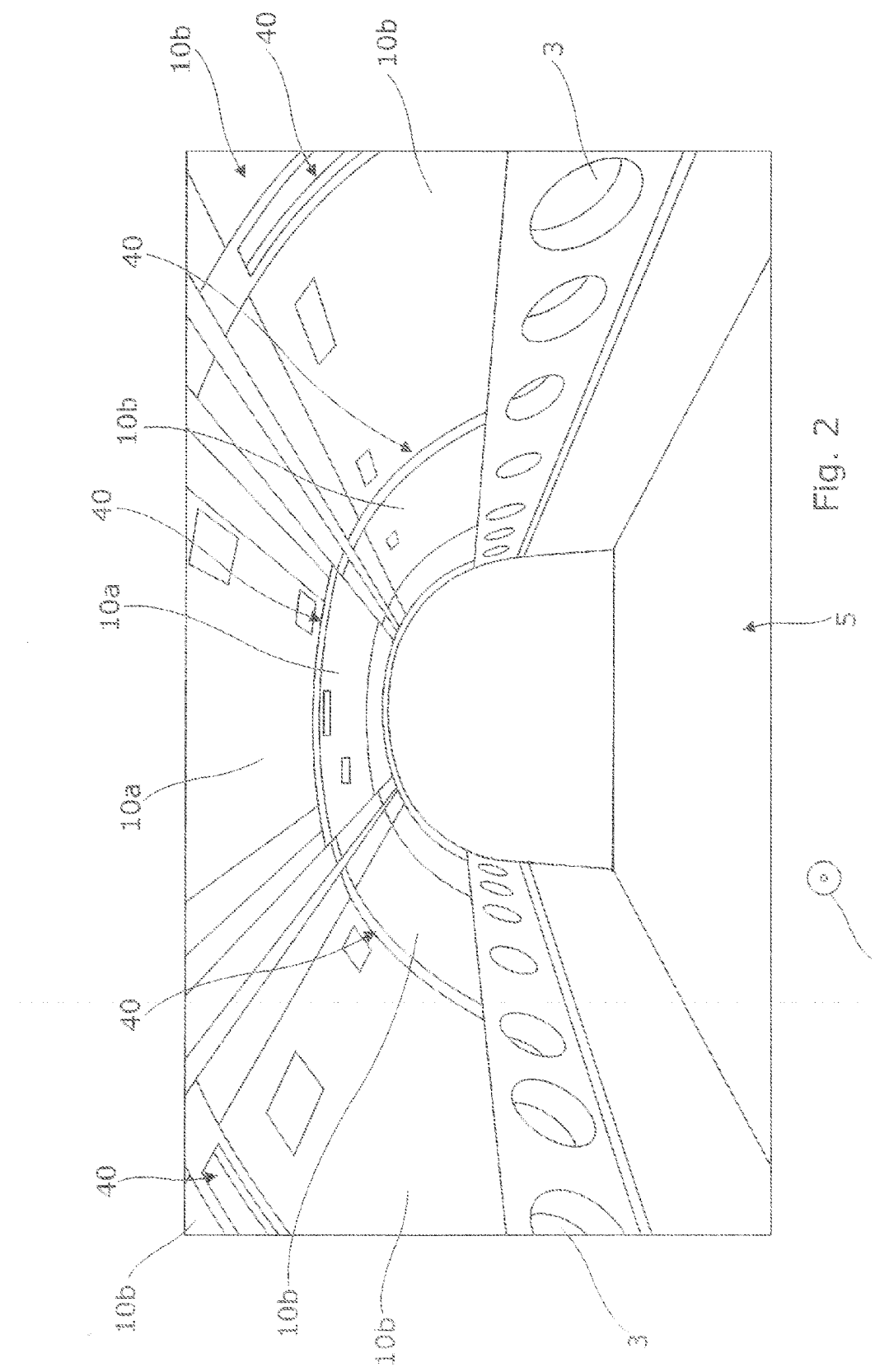
FIG. 2 is a perspective view of the interior of the cabin of FIG. 1 and of the interior furnishing thereof.

The interior furnishing typically comprises, as illustrated in FIG. 2, a plurality of trim panels placed in succession in the longitudinal direction X of the fuselage in order to cover the structural wall. The interior furnishing comprises two types of trim panels, which include side trim panels 10b and ceiling trim panels 10a. Each trim panel is connected to the structural wall 2 by means of removable connections of a type (not shown) such that the trim panel can be easily disassembled from said structural wall 2.

The side trim panels 10b extend along the length of the two lateral sides of the structural wall 2 from a lower rail 7b to an upper rail 7a. Each side trim panel is formed in a single piece, of which the transverse profile is curved, and, for example, has a concavity adapted to that of the structural wall 2.

The ceiling trim panels 10a, formed in a single piece of which the transverse profile is curved with a curvature similar to or different from that of the side trim panels, hide the space between the two upper rails 7a.

Gaps 15 (shown only in FIG. 4) are visible both on the left side and on the right side of the cabin 5 at the junction between two adjacent side trim panels 10b, and also at the ceiling of the cabin 5 between two adjacent ceiling trim panels 10a.

The cabin 5 also comprises a plurality of lighting devices. Each lighting device is arranged at the level of the gap 15 between two adjacent trim panels.

The lighting devices are of two types: the side lighting devices 20b and the ceiling lighting devices 20a. A side lighting device 20b is designed to hide the gap 15 between two adjacent side trim panels 10b, whereas a ceiling trim device 20a is designed to hide the gap between two adjacent ceiling trim panels 10a.

Figure 3:
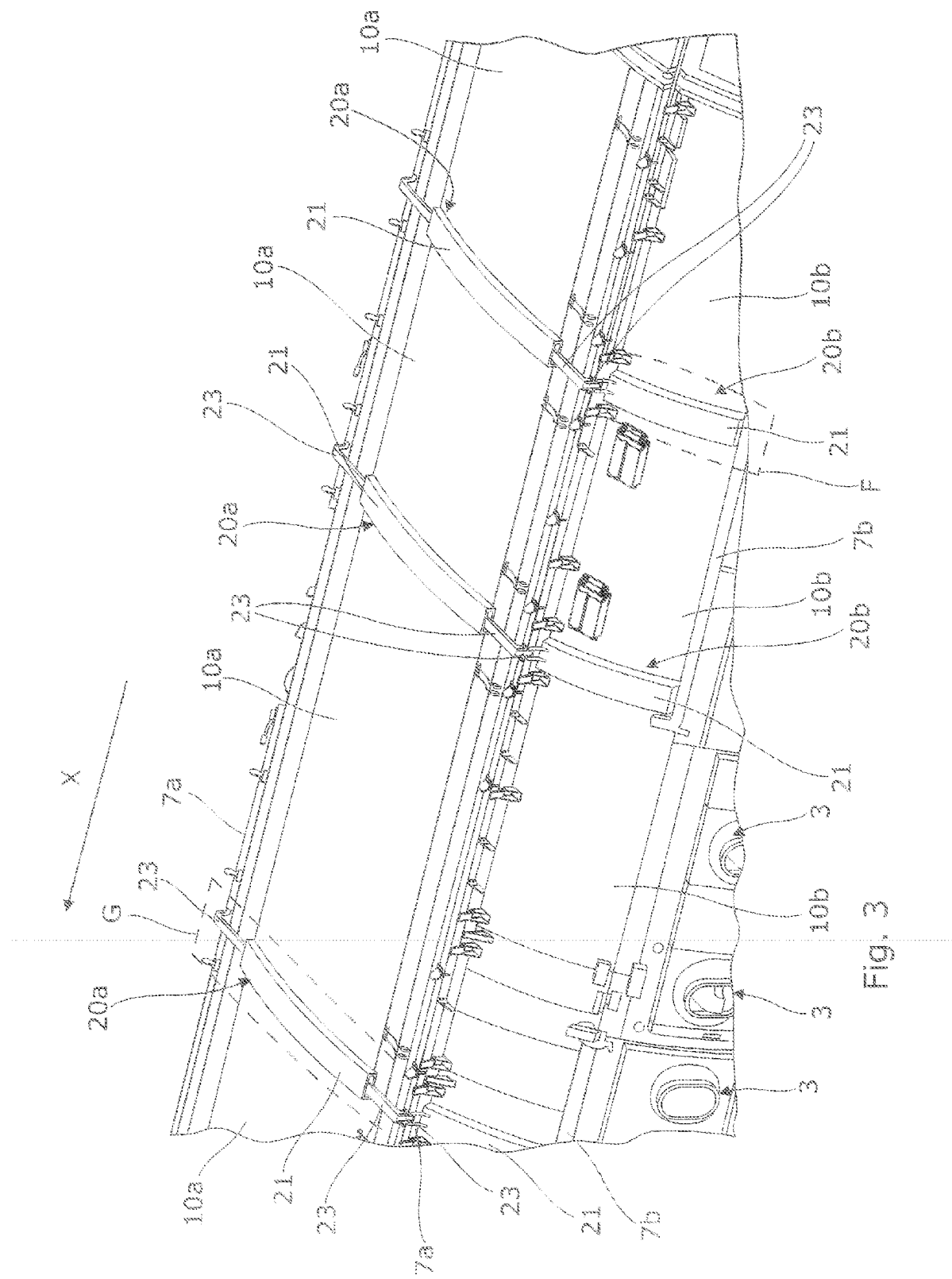
FIG. 3 is a partial perspective view on a larger scale of the fuselage of FIG. 1 in the direction of the arrow I.
Figure 4:
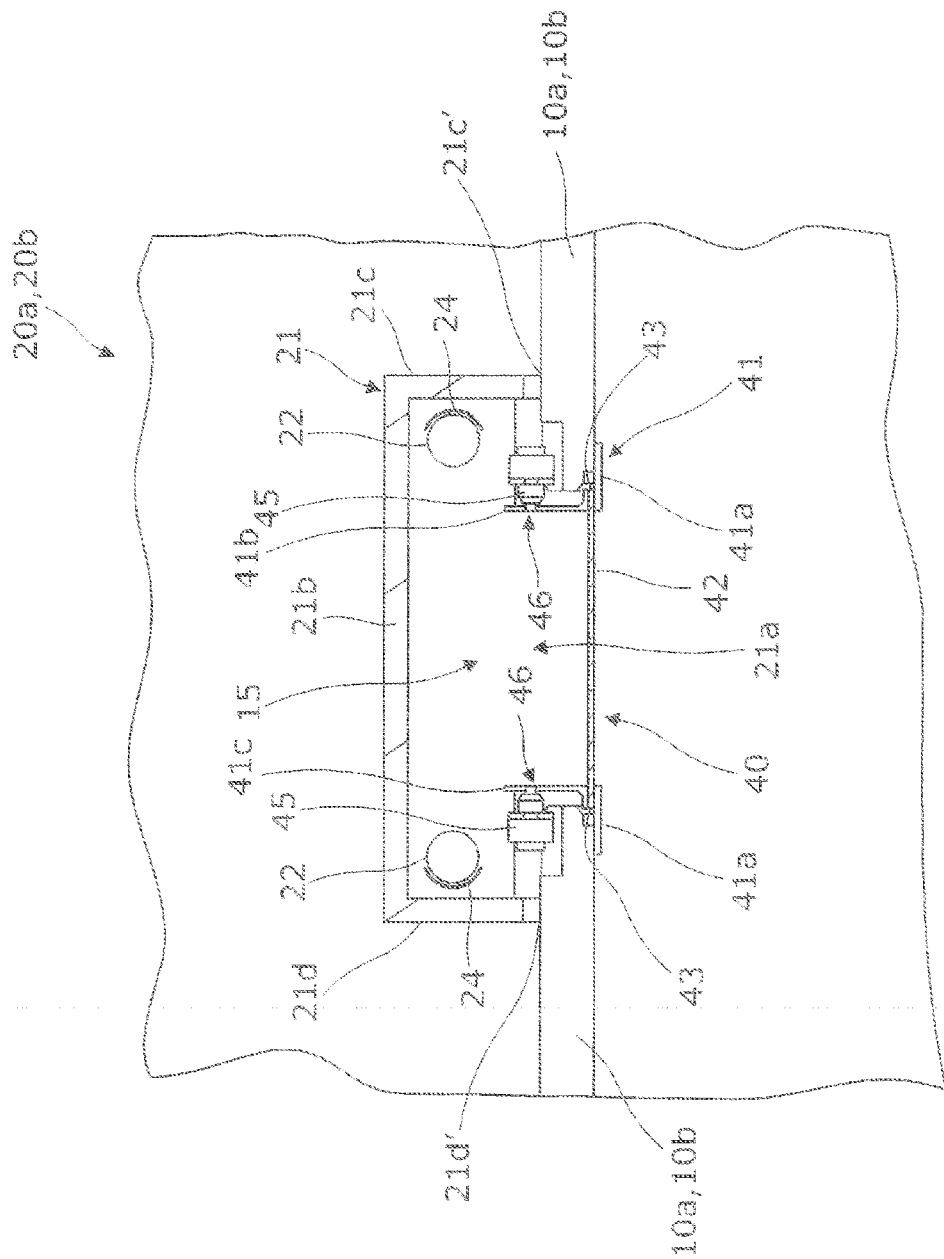
FIG. 4 is a cross-sectional view of a lighting device illustrated in FIG. 1.

With reference to FIGS. 3 and 4, each lighting device 20a, 20b, whether side or ceiling, comprises a housing 21, within which at least one lighting element 22 is fixed, and fixing elements 23 for fixing the housing to a pair of consecutive rails 7a, 7b. The term 'pair of consecutive rails' means:
the lower rail and the upper rail arranged on the same side of the fuselage; or
the upper rail on the left side of the fuselage and the upper rail on the right side of the fuselage.

Each housing 21 is located in the space provided between the adjacent trim panels 10a, 10b and the structural wall and, in cross section, has a rectangular shape comprising an open face 21a, a single large side 21b and two small sides 21c-d, which are parallel to one another and perpendicular to the large side 21b. By way of example, the large side 21b is approximately 150 mm in size, whereas the small sides 21c-d are approximately 60 mm in size. The housing 21 is closed at each of the ends thereof by a face 21e (not shown in FIGS. 3 and 4), referred to as an end face, fixed perpendicularly to the large and small sides.

The housing 21 is preferably formed in a single piece, for example, made of composite materials, and has a curved parallelepipedic shape (concave shape adapted to the shape of the fuselage) over the length thereof, such that, in profile, the open face 21a and the large side 21b are curved. The curvature of the open face 21a of a side lighting device is identical to that of a side trim panel 10b. Likewise, the curvature of the open face 21 a of a ceiling lighting device 20a is identical to that of a ceiling trim panel 10a.

In accordance with one embodiment, the housings 21 are fixed to the rails 7a or 7b, as the case may be, via fixing elements 23, such that the edge 21c' of a small side 21c of the housing comes into contact with the curved face of a first trim panel 10a, 10b and the edge 21d' of a second small side 21d of the housing 21 comes into contact with the curved face of a second trim panel 10a, 10b adjacent to the first. With this arrangement, the open face 21a of the housing is directed toward the cabin 5 so that the lighting elements light said cabin through the gaps 15. The housings 21 are preferably fixed to the rails such that the edge 21c' of a small side 21c of the housing and the edge 21d' of a second small edge 21d of the housing are each located substantially at equal distance from the gap 15.

The fixing elements 23 are, for example, brackets made of composite or metal material and are fixed, for example by screwing, both to the housing 21 and to a rail 7a, 7b to which the lighting device is fixed.

Figure 5:
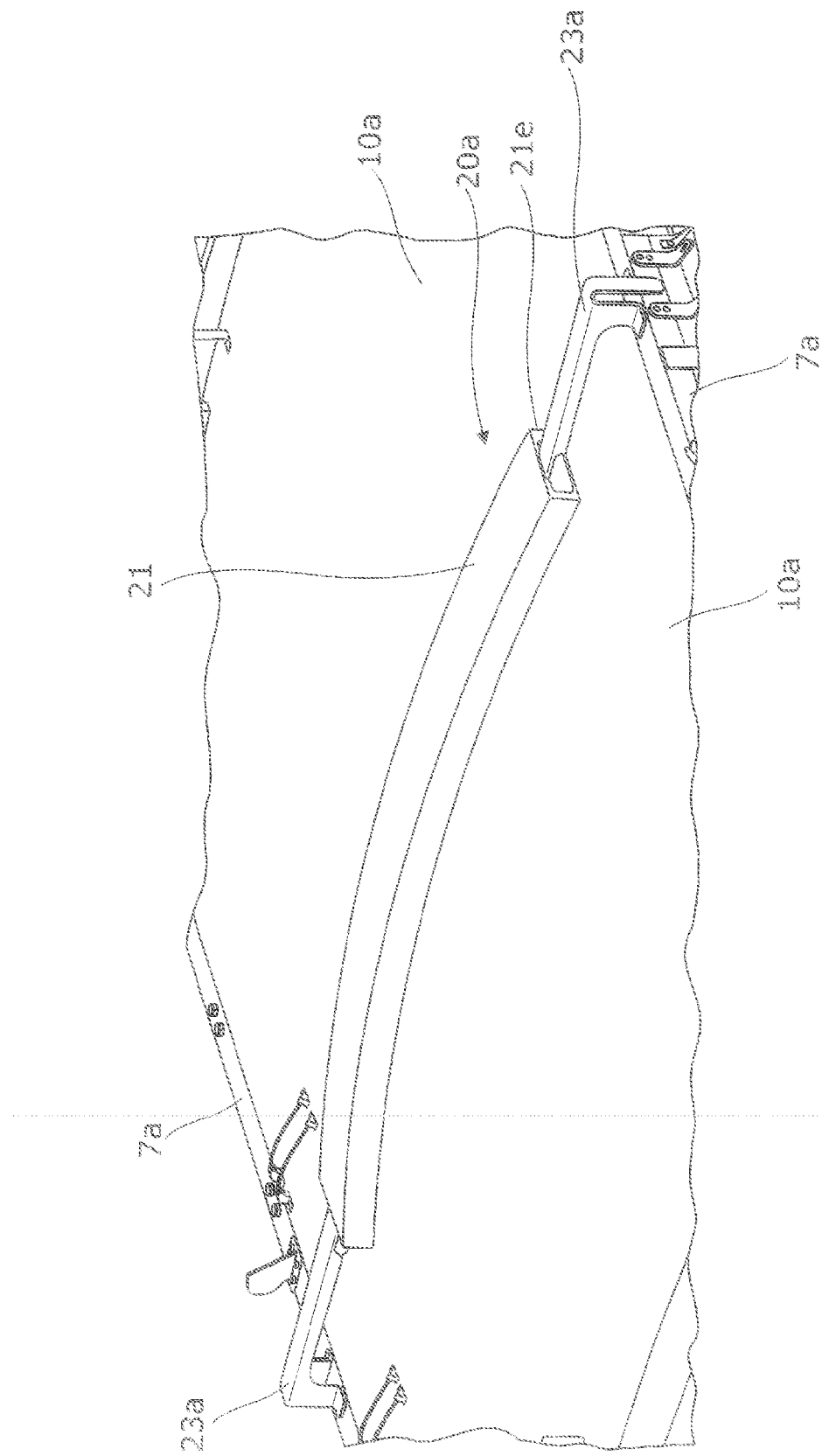
FIG. 5 is an enlarged view of the zone G shown by dashed lines in FIG. 3 and illustrates the fixing of a ceiling lighting device to the upper rails in accordance with a first variant of the invention.

In the case of a ceiling lighting device 20a, and as shown in FIG. 5, the fixing elements 23 comprise two identical brackets 23a. A first bracket 23a is screwed to a first end face 21e of the housing and to the upper rail 7a located on the left side of the fuselage, whereas the second bracket 23a is screwed to a second end face 21e of the housing and to the upper rail 7a located on the right side of the fuselage.

Figure 6:
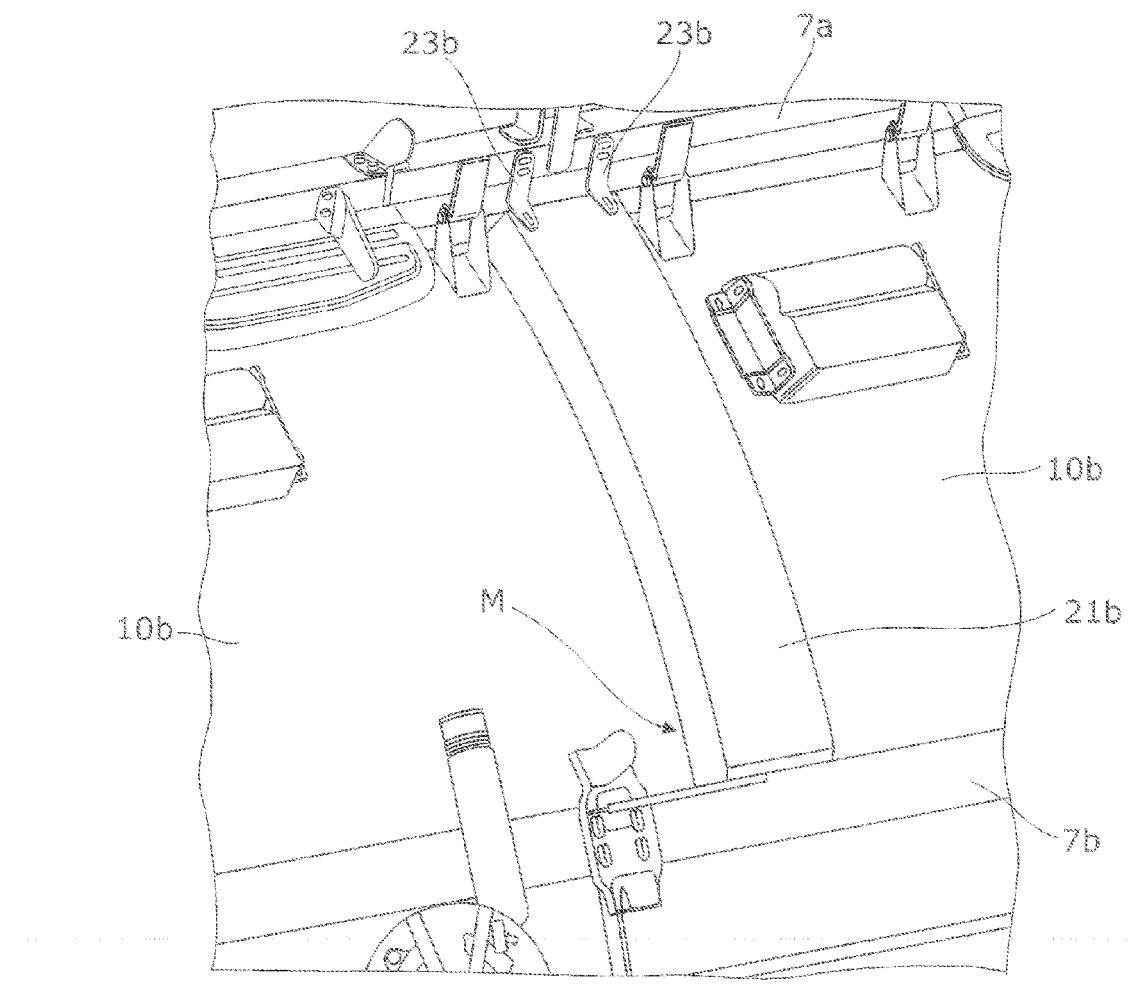
FIG. 6 is an enlarged view of the zone F shown by dashed lines in FIG. 3.
Figure 7:
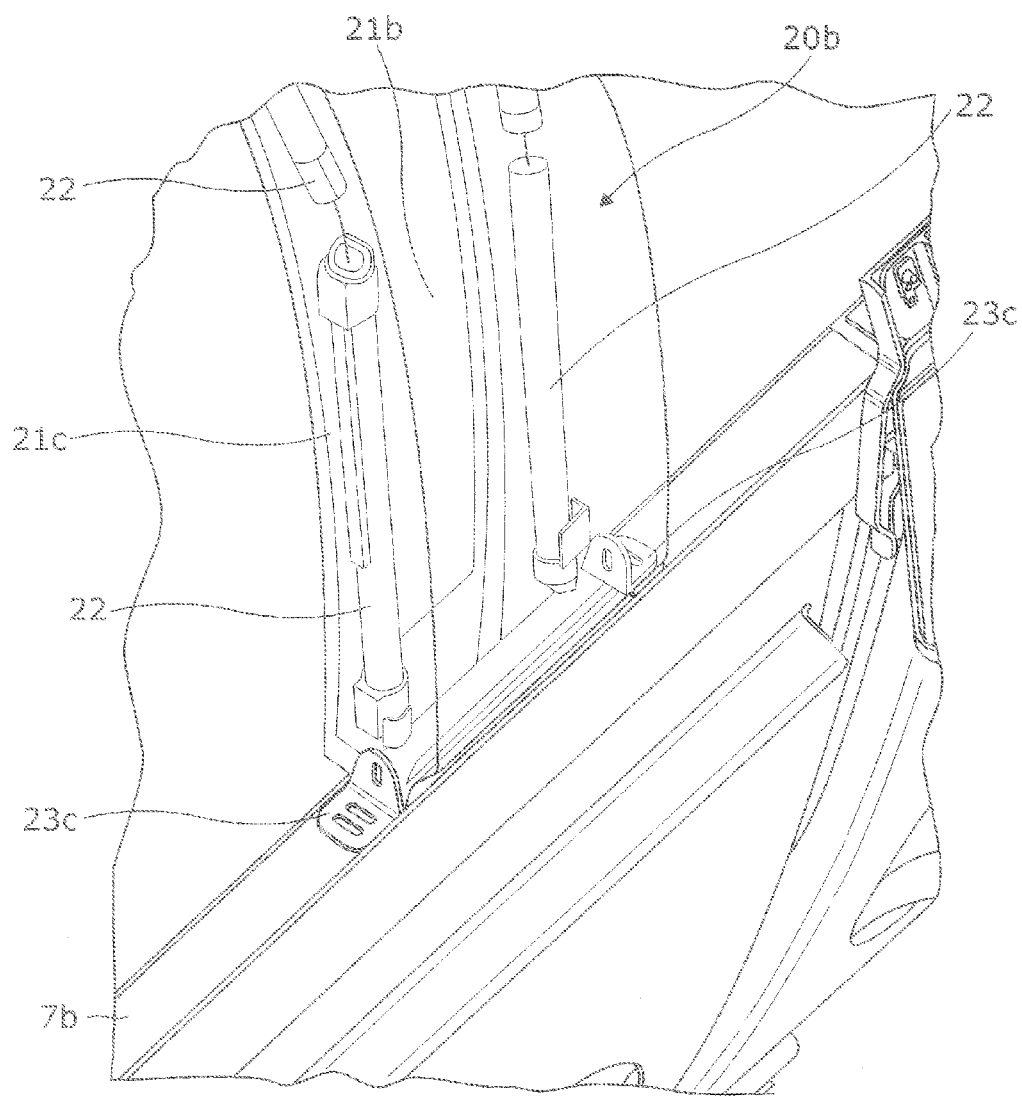
FIG. 7 is an enlarged view in the direction of the arrow M of FIG. 6 illustrating in detail the fixing of a side lighting device to a lower rail.

In the case of a side lighting device 20b, and as shown in FIGS. 6 and 7, the fixing elements 23 comprise four brackets 23b, 23c. Two first identical brackets 23b are screwed to the upper rail 7b and to the large side 21b of the housing at the level of an outer face of the housing, with a first bracket screwed close to one edge of the large side 21b and the other first bracket screwed close to another edge of the large side 21b. Two second identical brackets 23c are screwed to the lower rail 7b, with a second bracket 23c screwed on the first short side 21c and the other second bracket 23c screwed on the second short side 21d, symmetrically to the first bracket.

The holes formed on the brackets 23a-c in order to insert the screws intended to fix said brackets are preferably oblong in shape, as illustrated in FIGS. 6 and 7, so as to allow play in order to adjust the fixing of the brackets if necessary.

In the examples shown in FIGS. 3 and 7, the side or ceiling lighting device 20a, 20b comprises two lighting elements 22, with a first lighting element fixed on a first small side 21c and a second lighting element fixed on a second small side 21d. In accordance with this same example, each lighting element comprises a plurality of neon tubes disposed in series so as to occupy the entire length of the housing.

The tubes are fixed to the housing 21 by any means known to a person skilled in the art. As shown in FIG. 4, the tubes are fixed by means of a plurality of electric rings 24 fixed to the housing on a small side and in which the neon tube is inserted.

Power supply cables making it possible to supply the lighting elements 22 with electric current are fixed on the fixing elements 23 and are connected to the electrical network of the aircraft supported by the rails 7a, 7b carrying the different technical installations (not shown in the figures).

Each lighting device 20a, 20b is advantageously also associated with a transparent cover 40 provided to close access to the interior of the housing 21 through the gap 15 between two trim panels 10a, 10b. In relation to FIGS. 2 and 4, the transparent cover 40 is located in the interior of the cabin 5 and comprises a frame 41 forming a support for a transparent element 42. The frame 41 is rigid, for example made of metal, and the transparent element 42 is also rigid, but is made of polycarbonate or any other transparent material.

The frame 41 comprises a surface 41a and at least one pair of limbs 41b, 41c extending perpendicularly to the plane of the surface 41a. The surface 41a has a curvature identical to that of the trim panels 10a, 10b, against which said surface comes into contact so as to hide the gap 15. The surface 41a comprises a cutout formed in the center thereof over part of the length thereof, such that said surface has a rectangular form provided with a hollow.

In cross section, the surface 41a thus comprises a first side and a second side, the two sides being separated from one another by the cutout. A first limb 41b is fixed to a first side, whereas a second limb 41c is fixed to a second side, symmetrically to the first limb.

Each limb is in the shape of an L of which the base is parallel to the surface 41a and is fixed at the free end thereof to the surface 41a via a connector 43. The long part of the L extends for its part toward the interior of the housing 21.

A projection of the long part of the L of the first limb 41b, or respectively of the second limb 41c, is substantially flush with the free end of the first side, or respectively of the second side, located at the level of the cutout. The fixing of a limb 41b, 41c to the surface 41a via a connector 43 is such that a space of a few millimeters is provided between the base of the L and the surface 41a.

The transparent cover 42 is also fixed on the frame 41. To this end, the side edges of the cover are inserted, from each lateral side of the transparent cover, into corners delimited by the base of a limb 41b, 41c, the surface 41a and the connector 43.

The transparent cover 42 associated with a lighting device 20a, 20b is fixed only to the housing 21 via at least one pair of limbs 41b, 41c and is not fixed to the trim panels 10a, 10b. To this end, each long part of the L of a limb 41b, 41c comprises, for example, an orifice 46, whereas the housing 21 comprises a first pin 45 fixed perpendicularly to the first small side 21c of the housing and a second pin 45 fixed perpendicularly to the second small side 21d of the housing. Each pin 45 has a rounded free end intended to be inserted in part in an orifice 46. This fixing of the clipping type allows a rapid assembly and disassembly of the transparent covers 40 of the cabin.

By way of example, and in cross section, the surface 41a is 120 mm in size and the transparent element 42 is approximately 80 mm in size. On each side of the surface 41a, the free end of the base of the limb is located at a distance of 5 mm from the cutout. With such a dimension, the frame 41 is designed to be fixed to each of two adjacent trim panels 10a, 10b of the same type with functional play of approximately 5 mm with each trim panel. The functional play, making it possible to facilitate the work of operators installing the housings and the panels, is hidden from the view of occupants of the cabin by the surface 41a.

The description above makes it possible to highlight the advantages of the invention.

It should be noted in particular that the housings 21 and the trim panels 10a, 10b have no mechanical connection to one another besides point contact. Thus, the housings 21 remain fixed to the rails 7a, 7b irrespective of whether or not the trim panels are fixed to the structural wall 2. Thus, the lighting elements 22 light the cabin even when the trim panels are removed, since the disassembly of the latter does not involve removing the electrical power supply of the lighting devices comprised in the housings. The disassembly of the trim panels 10a, 10b thus merely requires the removal of the transparent covers 40, which are easily removed due to the nature of the fixing thereof.

Lastly, a further advantage of the invention is that the housings 21 of the side or ceiling lighting devices may serve as additional supports for technical installations as described further above.

In order to simplify the description of the application, the invention has been described under consideration of the fact that the ceiling and side trim panels of the same covering assembly have the same longitudinal dimension. Lighting devices as described in the application, however, can be arranged in the cabin 5 even in the case in which the ceiling and side trim panels of a covering assembly have different longitudinal dimensions.

The lighting elements can be of any known type and in particular comprise halogen tubes or fiber optic bundles. In the latter case, the lighting elements are then connected to the optical network of the aircraft during installation of the housings 21.

Figure 8:
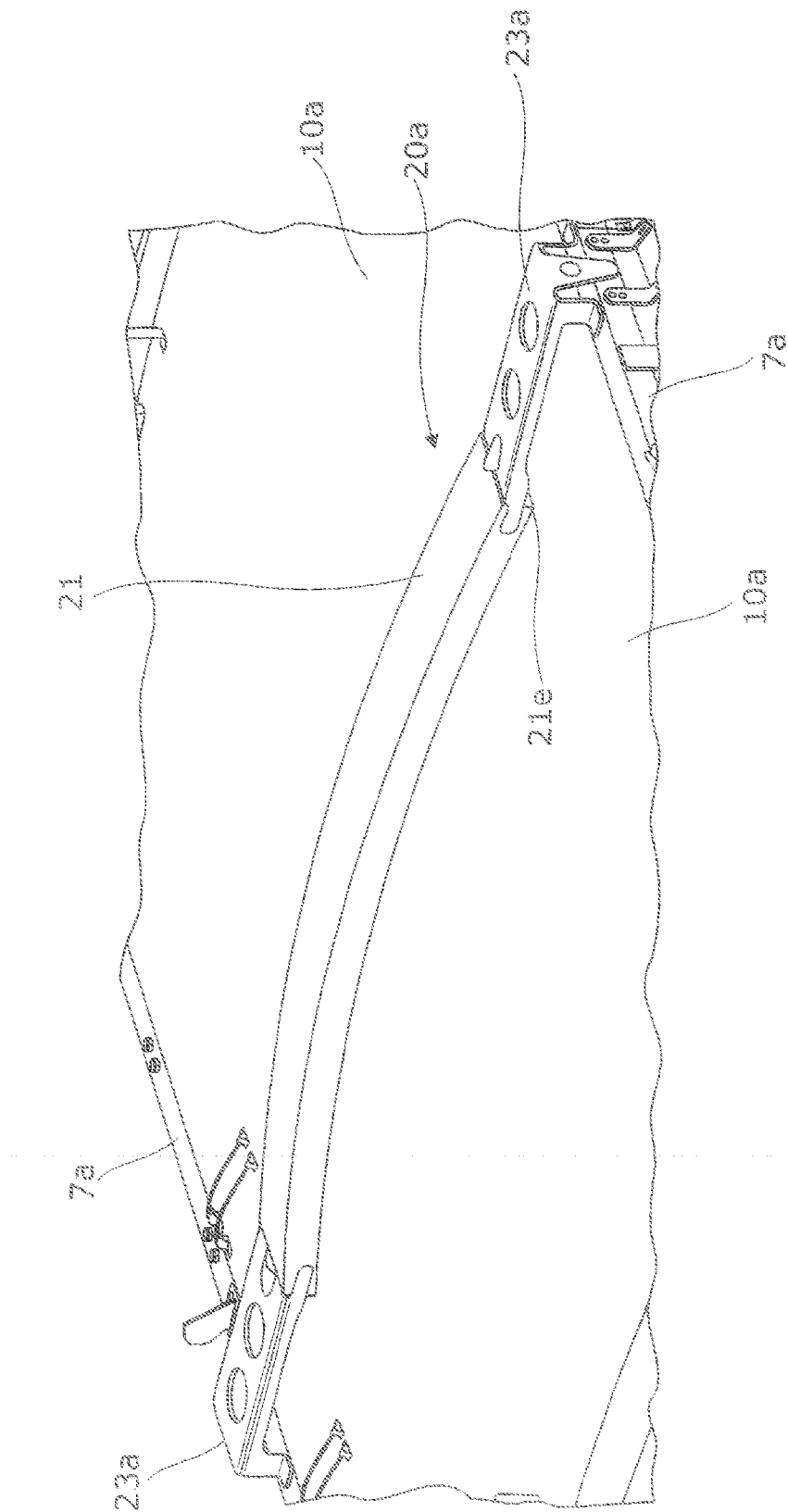
FIG. 8 is a view similar to FIG. 5 and illustrates the fixing of a ceiling lighting device to the upper rails in accordance with a second variant of the invention.

Lastly, with reference to FIG. 8, a variant for the fixing of the ceiling lighting devices consists in a fitting between the fixing elements 23 and the housings 21. The fixing elements 23 comprise two identical brackets 23a. A first bracket 23a is fitted at a first end face 21e of the housing and at the upper rail 7a located on the left side of the fuselage, whereas the second bracket 23a is fitted at a second end face 21e of the housing and at the upper rail 7a located on the right side of the fuselage.

The fitting is realized here via surfaces of complementary shapes which cooperate with one another so as to form an easily detachable mechanical connection.

Although described with the example of the fixing to the upper and lower rails of the cabin, the housings according to the invention could also be fixed to other elements of the wall of the fuselage, for example installed especially for this purpose.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft fuselage comprising:
   a structural wall and a floor delimiting a cabin for passengers,
      said wall being covered by a plurality of adjacent trim panels arranged in succession in a longitudinal direction of the fuselage and spaced from one another with a gap between each two adjacent panels,
      each panel also being fixed to the wall and having a concave shape adapted to a shape of the fuselage,
   at least one lighting device being disposed at a level of at least one of the gaps and being arranged perpendicularly to a longitudinal axis of the fuselage,
      said lighting device comprising a housing fixed to the wall,
      said housing being provided with an opening on a face oriented toward an interior of said cabin,
      said housing further comprising at least one lighting element configured and arranged to light the cabin through the at least one of the gaps.

2. The aircraft fuselage as claimed in claim 1, wherein two adjacent trim panels and one of said gaps are in contact with said housing at a level of the face of said housing.

3. The aircraft fuselage as claimed in claim 1, wherein said wall comprises, distributed along a full length of said fuselage, a plurality of longitudinal structural rails spaced in parallel, and wherein the lighting device is fixed to a first and to a second consecutive rail.

4. The aircraft fuselage as claimed in claim 2, wherein said face of the housing has a concavity identical to that of the two adjacent trim panels at the level of the gap in which the housing is located.

5. The aircraft fuselage as claimed in claim 1, wherein the face of the housing is closed by a transparent cover, said cover being fixed to said housing and resting on adjacent edges of two trim panels.

6. The aircraft fuselage as claimed in claim 5, wherein the transparent cover comprises a frame supporting a transparent element, said frame comprising a surface having a curved shape in contact with said two panels and adapted to the shape of said two panels, and at least one pair of limbs fixed to said surface, each limb also being fixed to the housing.

7. The aircraft fuselage as claimed in claim 6, wherein each limb has the shape of an L with a base and a long part, the base being parallel to the frame surface and being fixed at the free end thereof to the frame surface via a connector, the long part of the L extending toward an interior of the housing.

8. The aircraft fuselage as claimed in claim 7, wherein the transparent cover comprises lateral edges, said edges being inserted, from each lateral side of the transparent cover, into corners delimited by the base of one of the limbs, the surface and the connector.

9. The aircraft fuselage as claimed in claim 7, wherein the housing is parallelepipedic in shape and has, in cross section, a rectangular form comprising a single large side and two small sides parallel to one another and perpendicular to the large side, the housing being closed at each end thereof by an end face fixed perpendicularly to the large and to the small sides, a first small side being in contact with one of the two adjacent trim panels and a second small side being in contact with the other of the two adjacent trim panels.

10. The aircraft fuselage as claimed in claim 9, wherein each long part of the L of each of the limbs comprises an orifice, and wherein the housing comprises a first pin fixed perpendicularly to the first small side of the housing and a second pin fixed perpendicularly to the second small side of the housing, each pin having a rounded free end configured to be inserted in part in an orifice.

11. The aircraft fuselage as claimed in claim 9, wherein the housing comprises at least two lighting elements, with a first lighting element fixed on a first small side and a second lighting element fixed on a second small side.

\* \* \* \* \*